(12) United States Patent
Ishiko (10) Patent No.: US 6,374,561 B1
(45) Date of Patent: Apr. 23, 2002

(54) EXTERNAL WALL PANEL CONSTRUCTION

(75) Inventor: Takuo Ishiko, Nagoya (JP)

(73) Assignee: Nichiha Co., Ltd., Nagoya (JP)

( * ) Notice: Subject to any disclaimer, the term of this patent is extended or adjusted under 35 U.S.C. 154(b) by 0 days.

(21) Appl. No.: 09/441,301

(22) Filed: Nov. 16, 1999

(30) Foreign Application Priority Data

Nov. 18, 1998 (JP) .......................................... 10-328385

(51) Int. Cl.$^7$ ................................................ E04B 2/16
(52) U.S. Cl. ...................... 52/506.01; 52/366; 52/508; 52/511; 52/512; 52/762
(58) Field of Search ......................... 52/235, 366, 762, 52/764, 508, 510, 511, 512, 600, 481.1, 489.1

(56) References Cited

U.S. PATENT DOCUMENTS

| | | | | |
|---|---|---|---|---|
| 1,397,033 A | * | 11/1921 | Carson ........................ | 52/481.1 |
| 1,900,541 A | * | 3/1933 | Buelow et al. ............. | 52/481.1 |
| 2,066,205 A | * | 12/1936 | Keating ...................... | 52/489.1 |
| 2,075,773 A | * | 3/1937 | Vass ............................ | 52/481.1 |
| 2,116,533 A | * | 5/1938 | McCabe ....................... | 52/762 |
| 2,130,546 A | * | 9/1938 | Hovey ........................ | 52/489.1 |
| 2,268,822 A | * | 1/1942 | Heeren ....................... | 52/489.1 |
| 2,277,792 A | * | 3/1942 | Small .......................... | 52/489.1 |
| 3,023,866 A | * | 3/1962 | Moore .......................... | 52/508 |
| 3,185,267 A | * | 5/1965 | Pavlecka .................... | 52/481.1 |
| 3,524,666 A | * | 8/1970 | Schilf et al. ............... | 52/489.1 |
| 3,705,471 A | * | 12/1972 | Allen .......................... | 52/243 |
| 3,900,996 A | * | 8/1975 | Yohe ............................ | 52/241 |
| 4,171,920 A | | 10/1979 | Kramer et al. | |
| 4,275,541 A | * | 6/1981 | Orals et al. ................. | 52/483 |
| 4,602,467 A | * | 7/1986 | Schilger ..................... | 52/319 |
| 4,909,009 A | * | 3/1990 | Ogawa et al. ............... | 52/475 |
| 5,069,014 A | * | 12/1991 | Kubbutat ..................... | 52/235 |
| 5,138,813 A | * | 8/1992 | Cooney et al. ............... | 52/600 |
| 5,590,502 A | * | 1/1997 | Wendt ........................ | 52/489.2 |
| 5,956,910 A | * | 9/1999 | Sommerstein ............... | 52/235 |
| 5,996,299 A | * | 12/1999 | Hsuch ........................ | 52/481.2 |

FOREIGN PATENT DOCUMENTS

| | | | |
|---|---|---|---|
| JP | 54-74948 | 6/1979 | |
| JP | 55-173522 | 12/1980 | |
| JP | 59-22808 | 7/1984 | |
| JP | 62-108371 | 5/1987 | |
| JP | 62-164940 | 7/1987 | |
| JP | 64-12835 | * 1/1989 | |
| JP | 1-318654 | 12/1989 | |
| JP | 2-17044 | 1/1990 | |
| JP | 2-017044 | 5/1990 | |
| JP | 5-96240 | 4/1993 | |
| JP | 6-96883 | 4/1994 | |
| JP | 6-220951 | 8/1994 | |
| JP | 7-068735 | 7/1995 | |
| JP | 7-238597 | 9/1995 | |
| JP | 8-93177 | 4/1996 | |
| JP | 8-100506 | 4/1996 | |
| JP | 9-60193 | 3/1997 | |
| JP | 9-328864 | 12/1997 | |
| JP | 10-61033 | 3/1998 | |
| JP | 10-169152 | 6/1998 | |

* cited by examiner

Primary Examiner—Carl D. Friedman
Assistant Examiner—Phi Dieu Tran A
(74) Attorney, Agent, or Firm—Oblon, Spivak, McClelland, Maier & Neustadt, P.C.

(57) ABSTRACT

An external wall panel construction includes a furring member which is held on a rear surface of an external wall panel via a fixing plate. The fixing plate is provided on the rear surface of the external wall panel and is fixed to the external wall panel via a set screw. The external wall panel construction has a simple construction and an excellent appearance with no warping through many years

10 Claims, 12 Drawing Sheets

Fig. 12        PRIOR ART

EXTERNAL WALL PANEL CONSTRUCTION

CROSS-REFERENCE TO RELATED APPLICATIONS

This application is related and claims priority, under 35 U.S.C. 517 119, to Japanese Patent Application No. 10-328385, filed on Nov. 18, 1995, the entire contents of which is hereby incorporated by reference herein.

BACKGROUND OF THE INVENTION

1. Field of the Invention

The present invention relates to an external wall panel construction to be installed in houses, buildings, and similar.

2. Discussion of Background

An external wall panel is often installed on structures, such as houses and buildings, for the purpose of cladding the external walls.

Figure 11A:
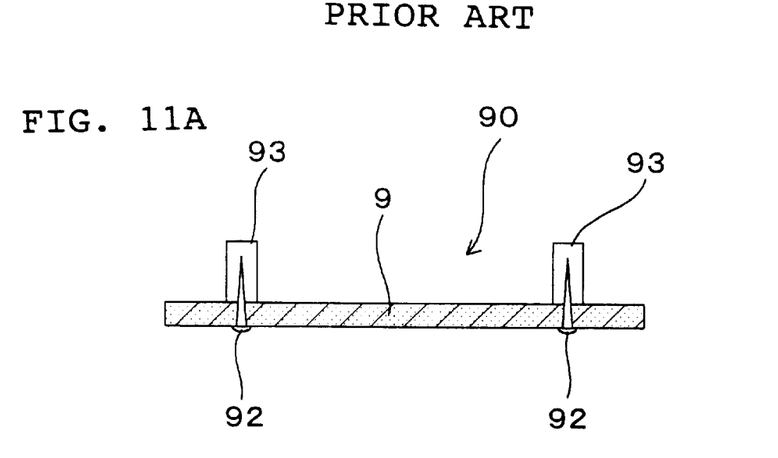
FIG. 11A is a plan cross-sectional view showing the construction of a conventional external wall panel construction.
Figure 11B:
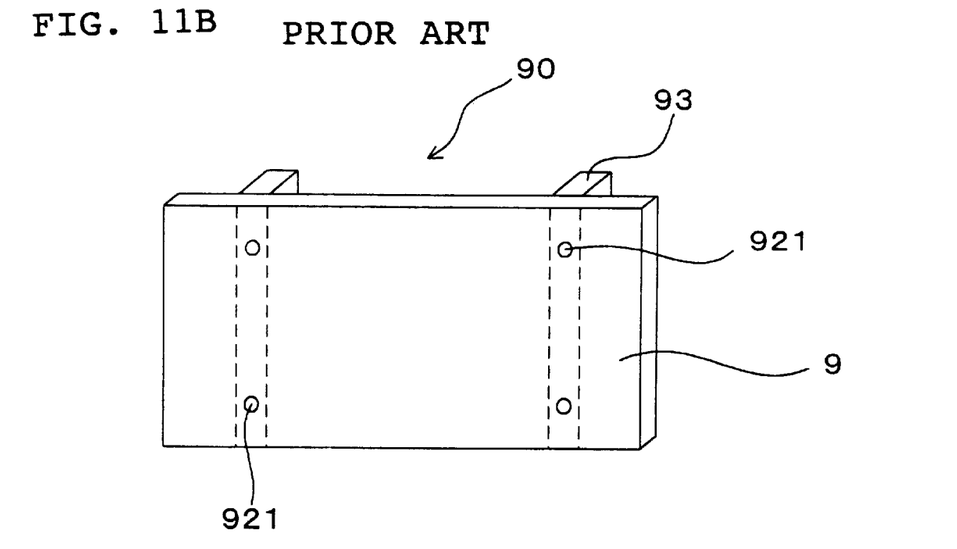
FIG. 11B is a perspective view showing the configuration of the conventional external wall panel construction as seen from the front thereof

External wall panels have conventionally been used by fixing a furring member 93 to the rear surface of an external wall panel 9, as shown in FIGS. 11A and 11B. The furring member 93 is fixed to the external wall panel 9 with a fixture 92, such as a nail, a screw, or a rivet, which is driven or screwed through the front surface of the external wall panel and into the furring member 93.

The furring member 93 is then fixed to a stud wall, such as an inner wall or an iron frame of a building.

Figure 12:
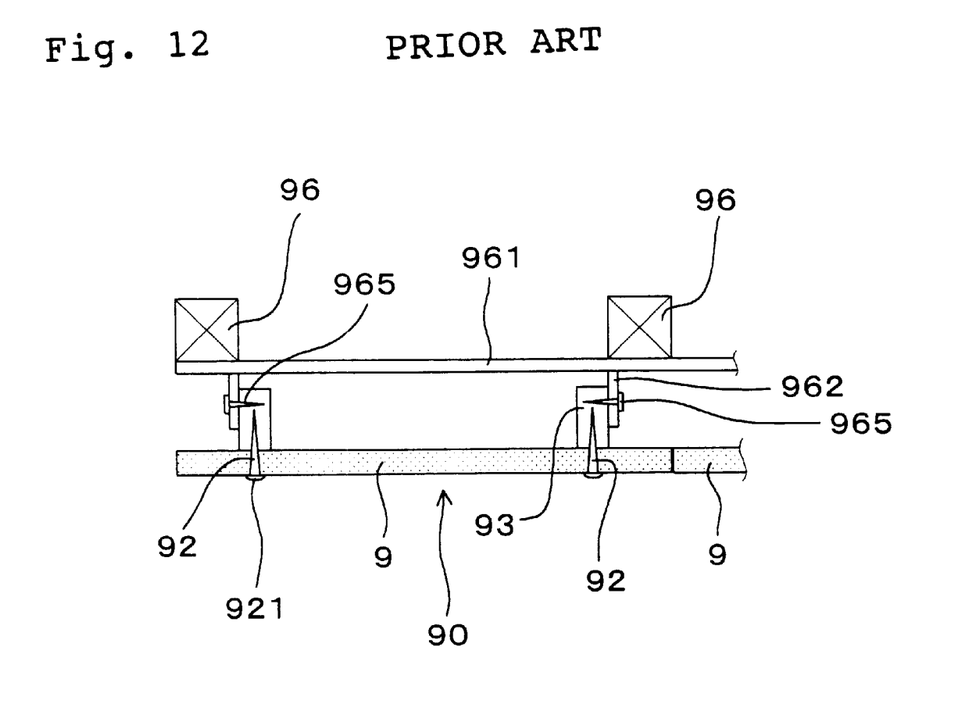
FIG. 12 is a plan cross-sectional view showing a state wherein the conventional external wall panel construction is installed on a stud wall.

As shown in FIG. 12, an external wall panel construction 90 includes the external wall panel 9 and the furring member 93 fixed thereto. The external wall panel construction 90 is fixedly installed on a stud wall 961 which is laterally provided on a pole 96 of a building. More specifically, the furring member 93 has a protruding fixing member 962 protruding therefrom. The protruding fixing member 962 is fixedly attached to the furring member 93 via a screw 965, which is screwed through the protruding fixing member 962 and into the furring member 93.

However, the conventional external wall panel construction has the following problem.

In the conventional external wall panel construction 90, the furring member 93 is fixed to the external wall panel 9 with a fixture 92, such as a nail or a screw, which is driven or screwed, respectively, into the furring member 93, through the front surface of the external wall panel 9. Thus, a head 921 of the fixture 92 sticks out slightly from on the front surface of the external wall panel 9.

It would be desirable to cover the head 921 of the fixture 92 with the same paint as that applied to the front surface of the external wall panel 9. However, the color of the paint on the front surface of the external wall panel 9 is likely to be somewhat discolored with age and/or weathering, and therefore applying fresh paint on the head 921 of the fixture 92 will most likely result in a deterioration in the appearance of the external wall panel 9.

Of course, it is conceivable to use a method of fixing the furring member 93 to the external wall panel 9, as described above, and then painting the entire front surface of the external wall panel 9.

However, if this is done, the entire thickness of the external wall panel construction 90 becomes too thick. This is because the thickness of the external wall panel 9 is added to the thickness of the furring member 93, so that the entire external wall panel construction 90 may become as thick as 10–15 cm.

Further, the furring member 93 projects rearwardly from the rear surface of the external wall panel 9.

Accordingly, in order to paint the external wall panel construction 90 having the above-described construction, a painting conveyor and an apparatus for feeding and transporting the external wall panel construction 90 to and from the painting conveyor necessarily has a complicated structure.

Further, after the conventional external wall panel construction 90 is installed on the stud wall 961, it has the following problems.

When the external wall panel 9 is made of concrete and the furring member 93 is made of steel, and the external wall panel construction 90 is located in a hot climate, the external wall panel 9 will slightly contract, if it becomes too dry, and the furring member 93 will elongate due to thermal expansion, if it becomes too hot. In humid climates, especially in those having a rainy season, the external wall panel 9, which is made of concrete, absorbs moisture and expands, and the furring member 93, which is made of steel, does not either expand or contract.

Since the external wall panel 9 and the furring member 93 are tightly fixed to each other with the fixture 92, such as the nail, penetrating through the front surface of the external wall panel 9, an expansion of one member and a contraction of the other member or an expansion of one member while the other member remains the same, between the external wall panel 9 and the furring member 93, causes the external wall panel 9 to warp and sometimes cracks the periphery of the fixture 92.

SUMMARY OF THE INVENTION

In view of the conventional problems, it is therefore an object of the present invention to provide an external wall panel construction having a simple configuration and an excellent appearance without warping.

The present invention is an external wall panel construction including an external wall panel and a plurality of furring members fixed to a rear surface of the external wall panel. The furring members are longitudinally provided independently on the rear surface of the external wall panel without contacting each other. The furring members are held on the rear surface of the external wall panel via a fixing plate, the fixing plates are fixed to the external wall panel, and the external wall panel construction is installed on a stud wall.

Furthermore, the furring members include at least an L-shaped cross-section portion having a base portion and a protruding fixing member. The base portion is held on the external wall panel via the fixing plate. The protruding fixing member protrudes from the base portion so that the furring member may be fixed to the stud wall via the protruding fixing member.

The key feature of the present invention is that the furring member is fixed to the rear surface of the external wall panel via the fixing plate provided on the rear surface of the external wall panel.

The operation and effect of the external wall panel construction of the present invention will be described in more detail below.

In the external wall panel construction of the present invention, the furring member is held on the rear surface of the external wall panel via a fixing plate. The fixing plate is provided on the rear surface of the external wall panel and is fixed to the external wall panel via a set screw. Thus, unlike the conventional art, the head of a fixture, for fixing the furring member to the external wall panel, is not exposed on the front surface of the external wall panel.

Accordingly, it is unnecessary to painting the head of a fixture to cover it, and thus deterioration of appearance due to partial discoloration of the front surface of the external wall panel can be avoided.

Thus, it is possible to initially apply a high-class design to the surface of the external wall panel.

Therefore, the external wall panel construction has an excellent outer appearance.

The furring member is fixed to the rear surface of the external wall panel with the fixing plate. Thus, the external wall panel construction has a simple configuration.

Further, as described above, the furring member is flexibly fixed to the rear surface of the external wall panel via the fixing plate. Thus, even though the external wall panel and the furring member expand or contract, either because of changes in temperature, such as in hot climates, or with absorption of moisture, such as in humid climates, the external wall panel and the furring member can expand or contract freely, and the external wall panel is not subject to warping.

In the case where the external wall panel is made of concrete, the furring member is made of metal, and either the external wall panel or the furring member expands or contracts greatly due to heat or absorption of moisture, the external wall panel construction of the present invention, having a furring member fixed to an external wall panel via a fixing plate, efficiently prevents the external wall panel from warping.

As described above, the present invention provides an external wall panel construction having a simple configuration and an excellent appearance without warping.

DETAILED DESCRIPTION OF THE PREFERRED EMBODIMENTS

In the present invention, the fixing plate is preferably fixed to the external wall panel by a set screw. Thus, the fixing plate can be fixed to the external wall panel easily and reliably.

The external wall panel may be made of concrete, stone, ceramic, wood, or similar material.

The fixing plate may be made of a sheet material, such as steel or spring steel.

The furring member may be made of wood or metal, such as steel or aluminum.

Preferably, the furring member includes at least an L-shaped cross-section portion having a base portion and a protruding fixing member. The base portion is held on the external wall panel via the fixing plate. The protruding fixing member protrudes from the base portion so that the furring member may be fixed to a stud wall. Therefore, the external wall panel construction has a simple construction.

Figure 1:
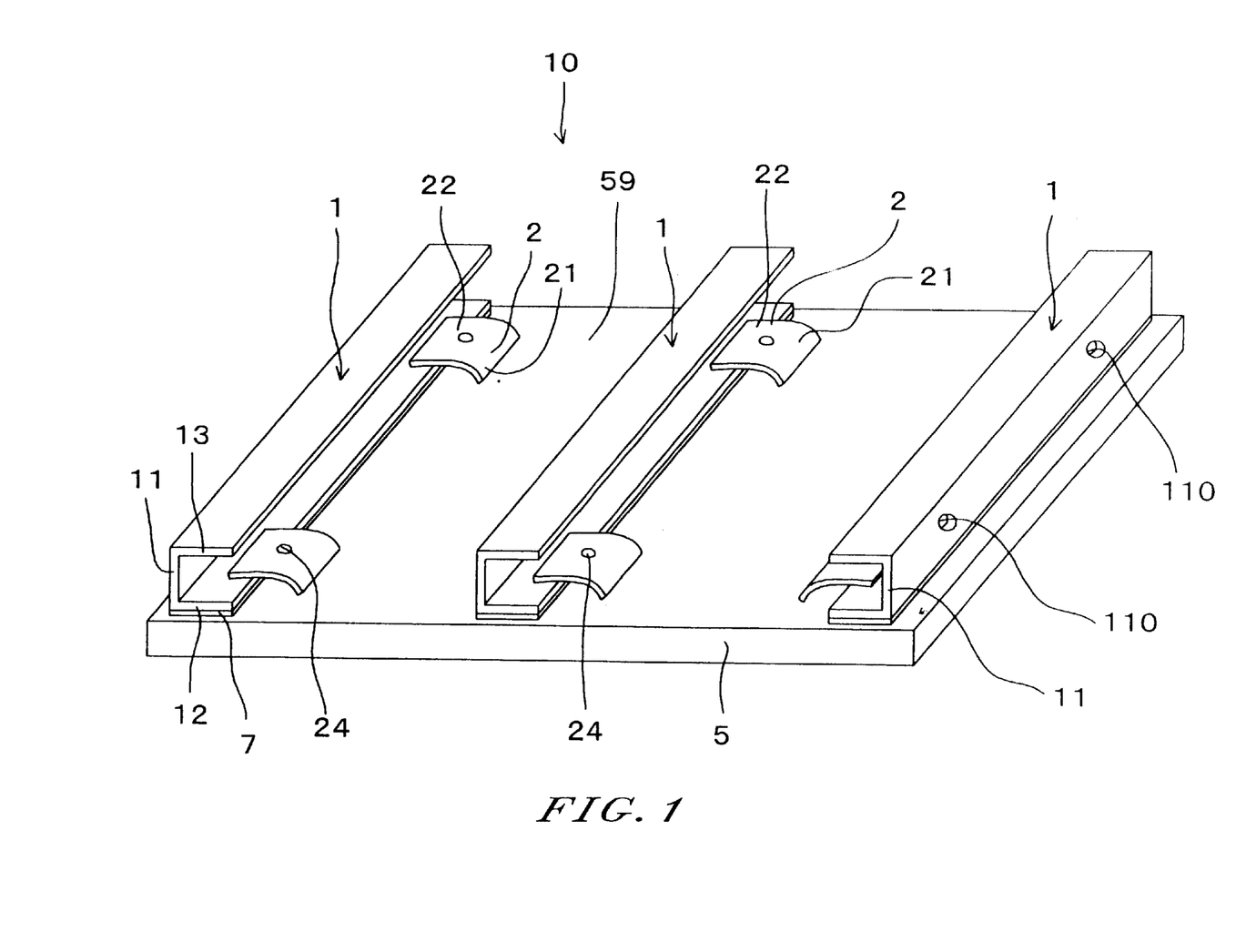
FIG. 1 is a perspective view showing a rear surface of an external wall panel construction of first embodiment of the present invention.

The furring member can be molded into a variety of different cross-sectional shapes. For instance, the furring member may be C-shaped as shown in FIG. 1, I-shaped as in FIG. 8A, inverted J-shaped as shown in FIG. 8B, or double-I-shaped (II-shaped) as shown in FIG. 8C.

Preferably, the furring member is made of steel. Thus, if there is a fire in the building or structure where the furring member is located, the furring member will not burn and will remain fixed in place on the external wall panel via the fixing plate, and the external wall panel will not drop from its fixed position of the furring member.

A plurality of furring members are each longitudinally provided independently on the rear surface of the external wall panel without contacting each other when the external wall panel construction is installed on a stud wall. In this case, since the furring members are longitudinally provided on the rear surface of the external wall panel, the external wall panel can be firmly retained at a position even in a strong wind. Further, it is easy to install the external wall panel construction on the stud wall.

Preferably, the furring member is fixed to the external wall panel not only by the fixing plate, but also by an adhesive agent. In this case, since the furring member is adhered to the external wall panel with an adhesive agent, the furring member can be securely fixed to the external wall panel. Further, in a case where a difference in expansion and contraction between the furring member and the external wall panel accrues, the adhesive agent absorbs the difference in expansion and contraction between the furring member and the external wall panel.

Preferably, the adhesive agent has elasticity. In this case, the difference in expansion and contraction between the furring member and the external wall panel can be absorbed more efficiently by the elastic property of the adhesive agent.

It is preferable that the fixing plate is made of metal and that the fixing plate is substantially arc-shaped in order to secure a height of the fixing plate at an elevation that is higher than the elevation of the surface of the furring member to be fixed to the external wall panel via the fixing plate at the rear surface of the external wall panel in order to fix the furring member to the rear surface of the external wall panel.

Figure 2A:
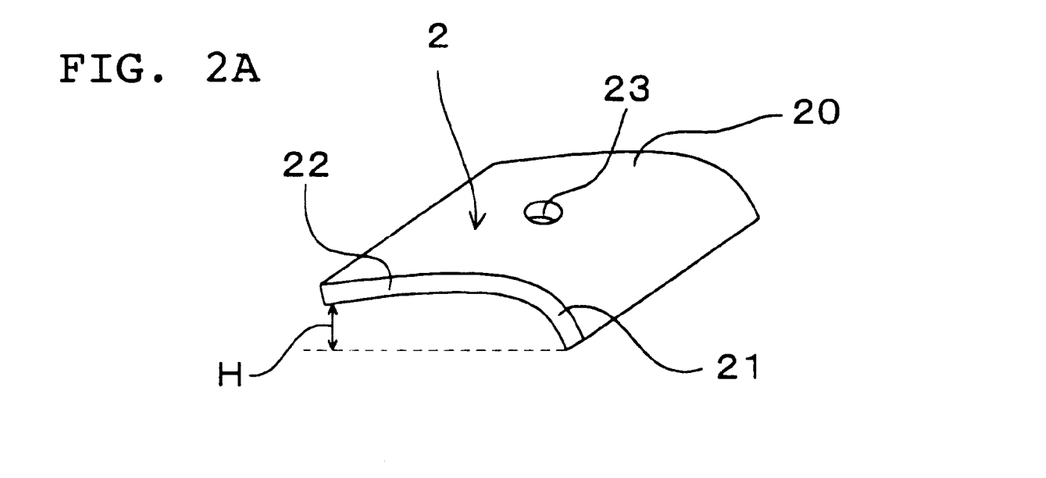
FIG 2A is a perspective view showing a fixing plate of the first embodiment of the present invention.
Figure 2B:
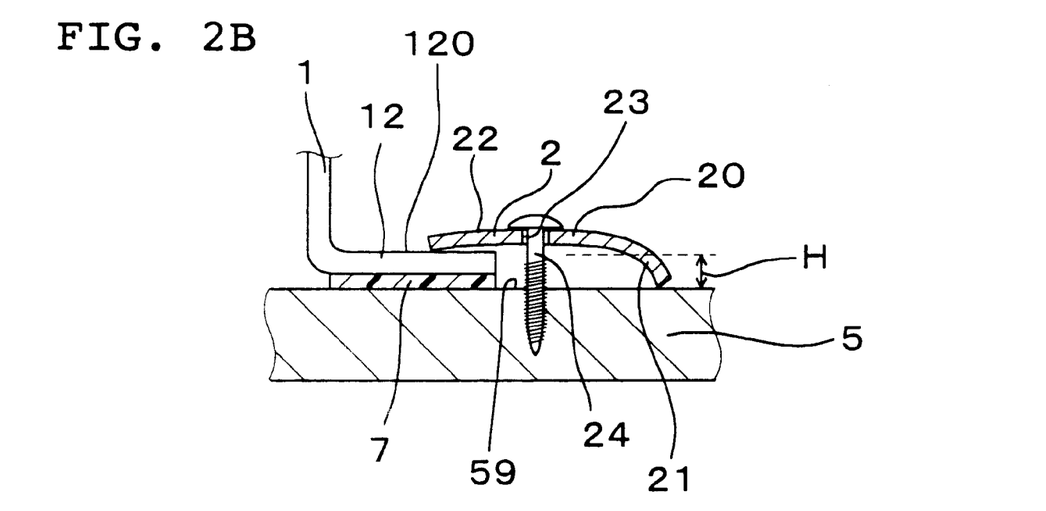
FIG. 2B is a cross-sectional view showing a state in which a furring member is fixed to the external wall panel via the fixing plate of the first embodiment of the present invention.

In this case, since the fixing plate is substantially arc-shaped, as shown in FIGS. 1 and 2, the fixing plate can flexibly fix the furring member to the external wall panel and thus, efficiently absorb any difference in expansion and contraction between the furring member and the external wall panel.

A contact end portion of the fixing plate contacts the rear surface of the external wall panel and is preferably hook-shaped.

Further, when the contact end portion of the fixing plate is hook-shaped, as shown in FIG. 2, a base portion of the furring member can be fixed to the external wall panel reliably and tightly.

The furring member is fixed to the external wall panel with the fixing plate made of metal. Thus, if a fire breaks out, the fixing plate continues to hold the furring member to the external wall panel. Thus, the external wall panel is not removed and does not drop from the furring member.

It is preferable that the approximately arc-shaped fixing plate has a front portion which makes contact with a rear surface of the external wall panel, wherein the front portion makes line contact with the furring member, while the contact end portion makes line contact with the external wall panel. In this case, the fixing plate can flexibly fix the furring member to the rear surface of the external wall panel.

Preferably, the furring member is attached to the rear surface of the external wall panel by extending of the fixing plate on the furring member and the rear surface of the external wall panel. In this case, the fixing plate can flexibly fix the furring member to the rear surface of the external wall panel.

It is preferable that the fixing plate is fixed by a set screw screwed into the external wall panel, except for the penetration of the set screw into the furring member. In this case, the fixing plate can be prevented from being removed from the external wall panel.

Preferably, the furring member is I-shaped (or "sideways" H-shaped) in cross-section and includes a base portion, a protruding fixing member, and a parallel portion. The base portion is positioned at one side of the furring member to be fixed to the external wall panel. The protruding fixing member protrudes from the base portion so that the furring members may be installed on the stud wall. The parallel portion extends to two opposite directions of the protruding fixing member and is parallel to the base portion at its location on the top end of the protruding fixing member. This makes the present invention more effective. In this case, the furring member may be made of H-type steel, one side of which is the base portion, and the other sides of which form the protruding fixing member.

Preferably, the furring member is inverted J-shaped in cross-section and includes a base portion, a protruding fixing portion, and a parallel portion. The base portion is positioned at one side of the furring member and is fixed to the external wall panel. The protruding fixing member protrudes from the base portion and is connected to a stud wall. The parallel portion extends in only one direction of the protruding fixing member and is parallel to the base portion at its location on the top end of the protruding fixing member. This makes the present invention more effective. In this case, the furring member may be made of H-type steel, one side of which is the base portion, and the other sides of which form the protruding fixing member.

Preferably, the protruding fixing member is made up of two plate-like parts having a clearance between them. This makes the present invention more effective. In this case, the furring member may be made of H-type steel, one side of which is the base portion, and the other sides of which form the protruding fixing member.

First Embodiment

The external wall panel construction of the first embodiment will be described below with reference to FIGS. 1 to 7B.

As shown in FIGS. 1 to 4B, an external wall panel construction 10 of the first embodiment includes an external wall panel 5 and a furring member 1, wherein the furring member 1 is fixed to a rear surface 59 of the external wall panel 5.

Referring to FIGS. 1 and 2B, the furring member 1 is held on the rear surface 59 of the external wall panel 5 with a fixing plate 2 in order to be fixed to the external wall panel 5. The furring member 1 may also be fixed to the external wall panel 5 with an adhesive agent 7.

The fixing plate 2 is made of metal and is substantially arc-shaped in order to allow for a height of the fixing plate 2 to be higher than a height of the fixing surface 120 of the furring member 1 above the rear surface 59 of the external wall panel 5, when the furring member 1 is fixed to the rear surface 59 of the external wall panel 5 via the in fixing the furring member 1 to the rear surface 59 of the external wall panel 5. A contact end portion 21 of the fixing plate 2 contacts the rear surface 59 of the external wall panel 5 and is hookshaped.

The furring member 1 is held on the rear surface 59 of the external wall panel 5 by extension of the fixing plate 2 on the furring member 1 and the rear surface 59 of the external wall panel 5. In this case, the fixing plate 2 can flexibly fix the furring member 1 to the rear surface 59 of the external wall panel 5.

The fixing plate 2 is fixed to the external wall panel 5 via a set screw 24.

These members will be described in detail below.

As shown in FIGS. 1 to 4B, the furring member I of the first embodiment is preferably made of steel and is substantially channel-shaped in cross-section. The furring member 1 includes an L-shaped cross-section portion made up of a protruding fixing member 11 and a base portion 12. The protruding fixing member 11 has an insertion hole 110. The base portion 12 is adhered to the rear surface 59 of the external wall panel 5 via an adhesive agent 7 and is also held on the external wall panel via the fixing plate 2. The furring member 1 also includes a parallel portion 13 extending from the upper end of the protruding fixing member 11 so as to be parallel to a piece of structural steel 6 forming a stud wall. As shown in FIG. 4A, a clearance 60 is formed between the parallel portion 13 and the piece of structural steel 6.

A plurality of furring members 1 are vertically fixed to the external wall panel 5 at regular intervals. Each furring member 1 is held on and fixed to the external wall panel 5 via the fixing plate 2 and set screw 24.

As shown in FIGS. 2A and 2B, the fixing plate 2 is substantially arc-shaped. The fixing plate 2 includes a main body 20, a contact end portion 21, a front portion 22, and an insertion hole 23. The contact end portion 21 contacts the rear surface 59 of the external wall panel 5. The front portion 22 contacts the fixing surface 120 of the upper surface of the base portion 12.

The contact end portion 21 is a portion curving from the main body 20 and is hook-shaped. As shown in FIGS. 2A and 2B, a height H of the fix of the fixing surface 120 of the furring member 1 is above the rear surface 59 of the external wall panel 5.

In the first embodiment, since the furring member 1 is fixed to the external wall panel 5 via the adhesive agent 7, the height H is slightly greater than that in a case where the adhesive agent 7 is not used. The front portion 22 and the contact end portion 21 of the fixing plate 2 contact the furring member 1 and the external wall panel 5, respectively, in a line contact state. Therefore, the fixing plate 2 has a high degree of pressing fixing force.

Figure 3A:
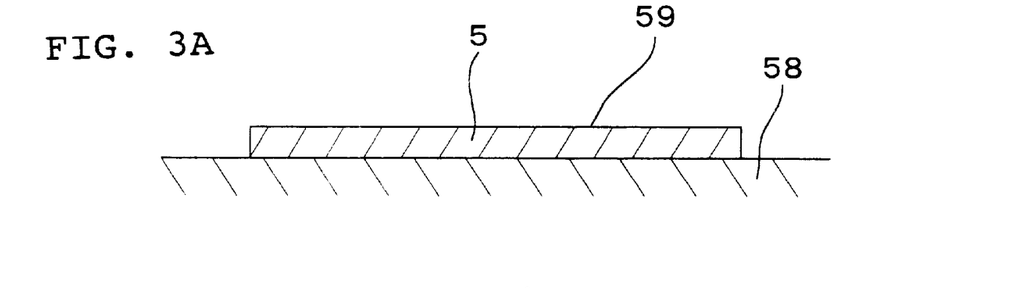
FIGS. 3A to 3C are cross-sectional views each showing a method of fixing the furring member to an ternal wall panel in the first embodiment of the present invention.
Figure 3B:
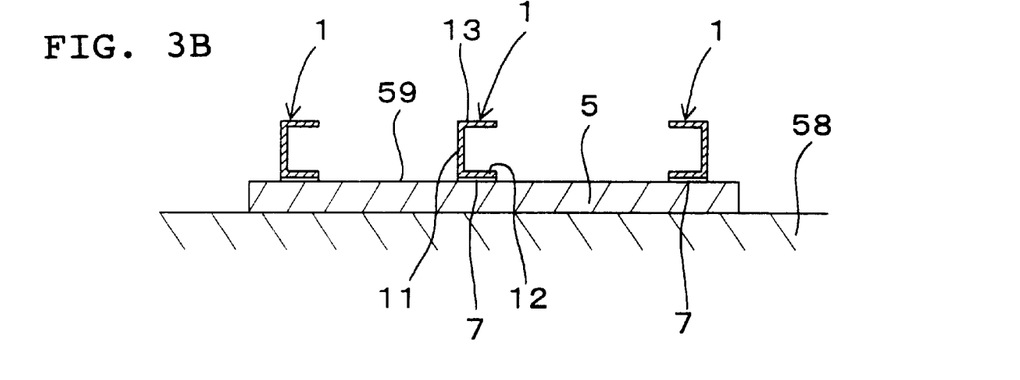

To fix the furring member 1 to the external wall panel 5, the external wall panel 5 is placed on a worktable 58 so that the side corresponding to the rear surface 59 of the external wall panel 5 is an upper side, as shown in FIG. 3A, and then the base portion 12 of the furring member 1 is adhered to the external wall panel 5 via the adhesive agent 7, as shown in FIG. 3B.

Figure 3C:
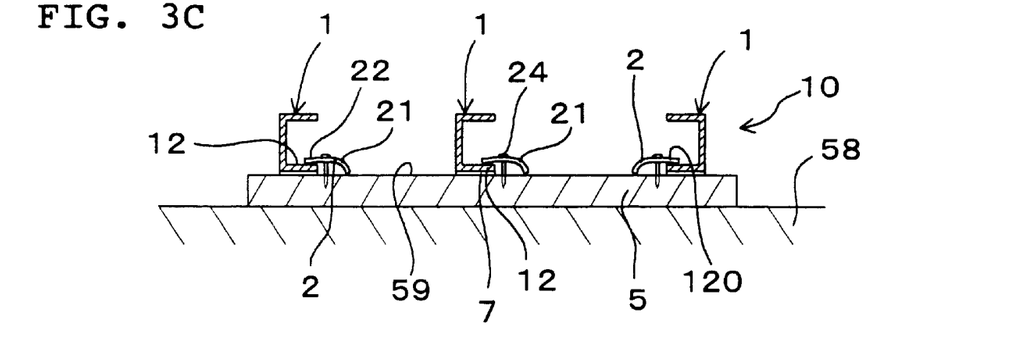

Then, the front portion 22 of the fixing plate 2 is brought into contact with the fixing surface 120 of the base portion 12 of the furring member 1, and the contact end portion 21 of the fixing plate 2 is placed in a position in contact with the rear surface 59 of the external wall panel 5. Then, the set screw 24 is inserted into the insertion hole 23 and screwed into the external wall panel 5, as shown in FIG. 3C.

In the first embodiment, the external wall panel 5 is a flat plate made of concrete and having a thickness of 10 mm. The furring member 1 is made of steel and the fixing plate 2 is made of spring steel. The adhesive agent 7 is made of modified silicone resin so as to be somewhat elastic in adhering the furring member 1 to the external wall panel 5.

Referring to FIGS. 4A to 7B, the external wall panel construction 10 is installed on a piece of structural steel 6 forming the stud wall as will be described in more detail below.

Figure 4A:
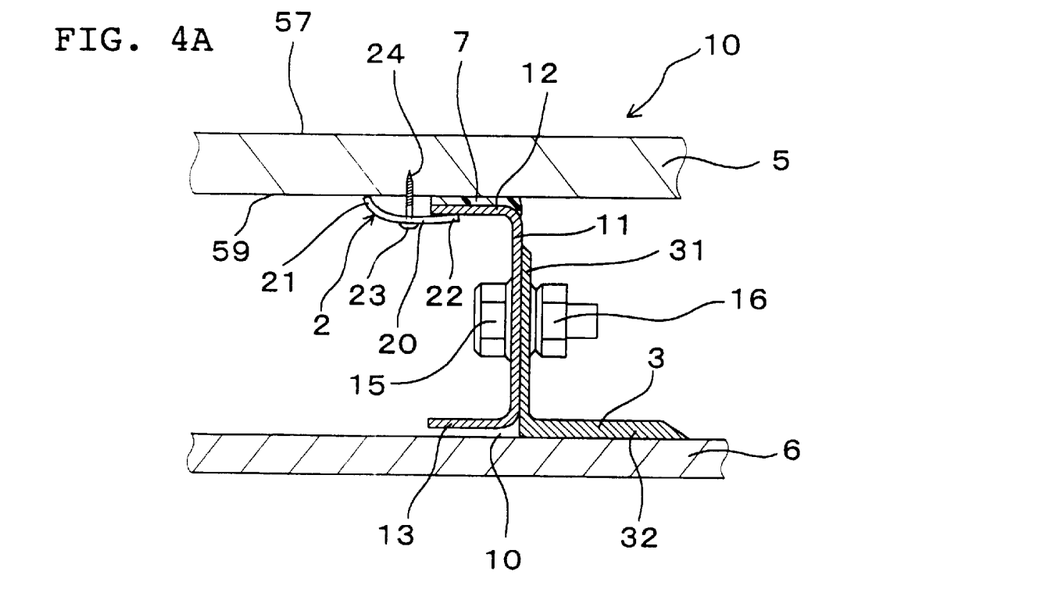
FIG. 4A is an enlarged cross-sectional view showing a state in which the external wall panel construction is installed on a stud wall of the first embodiment of the present invention.
Figure 4B:
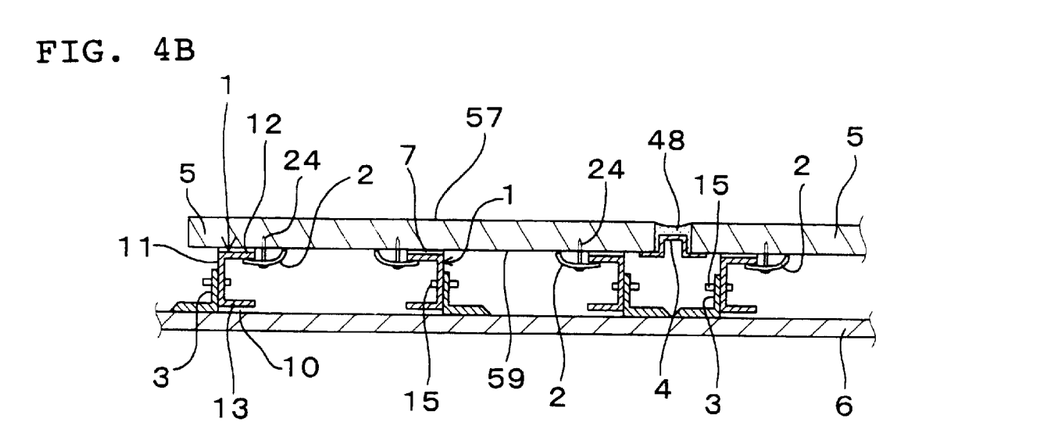
FIG. 4B is a cross-sectional view entirely illustrating a state in which a plurality of the external wall panel constructions are installed on the stud wall in the first embodiment of the present invention.

An angle member 3 is fixed to the piece of structural steel 6 forming the stud wall at a position corresponding to the position of the furring member 1 to be fixed to the external wall panel 5. The angle member 3 includes a fixing portion 31 and a base portion 32. The fixing portion 31 has an insertion hole formed therethrough and the base portion 32 is to be fixed to the piece of structural steel 6.

A bolt 15 is inserted into the insertion hole of the angle member 3 and the insertion hole of the furring member 1. A nut 16 is spirally tightened on the bolt 15 to fix the external wall panel construction 10 to the piece of structural steel 6 as shown in FIGS. 4A and 4B.

Figure 5:
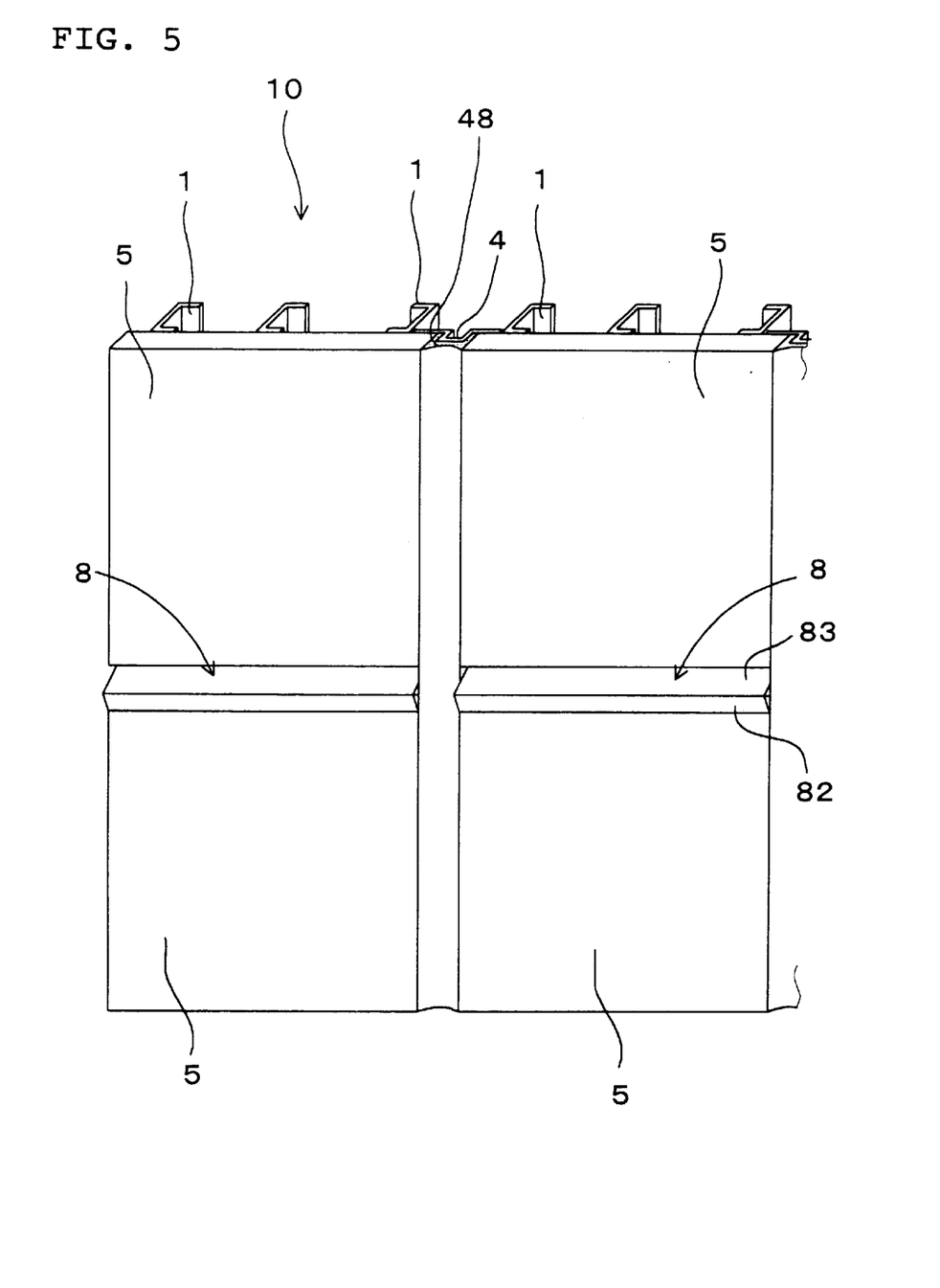
FIG. 5 is a perspective view showing a state wherein the external wall panel constructions, as seen from the front thereof, are installed on the stud wall in the first embodiment of the present invention.

The external wall panel 5 has a size of approximately 1 m×1 m. As shown in FIG. 5, a plurality of external wall panels 5 are combined and installed on the piece of structural steel 6 to form an outer wall.

As shown in FIGS. 4B, 5, 6A, and 6B, a hat joiner 4 forms a connection member and is interposingly mounted between side surfaces of the adjacent external wall panels 5. A channel-shaped clearance, between the side surfaces of the adjacent external wall panels 5 and the hat joiner 4, is filled with a joint compound 48.

Figure 6A:
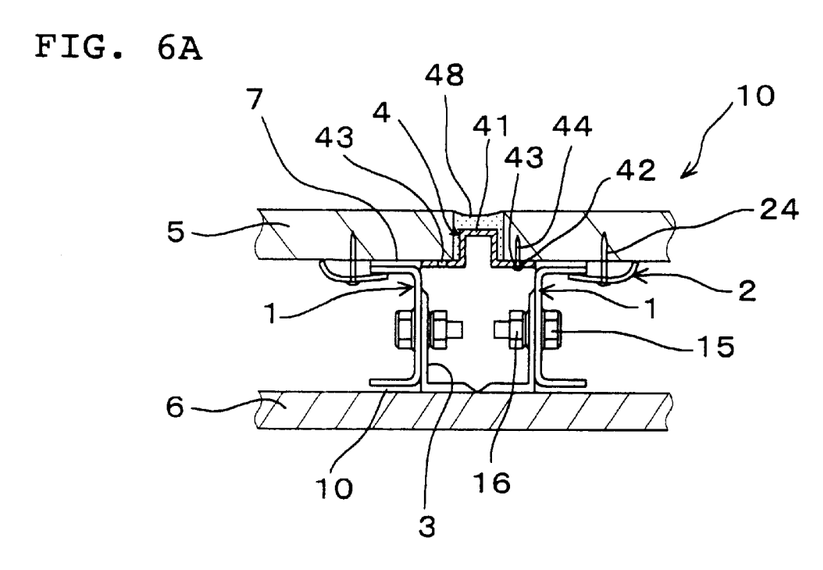
FIG. 6A is a cross-sectional view showing a state wherein the external wall panel constructions are installed on the stud wall in the first embodiment of the present invention.
Figure 6B:
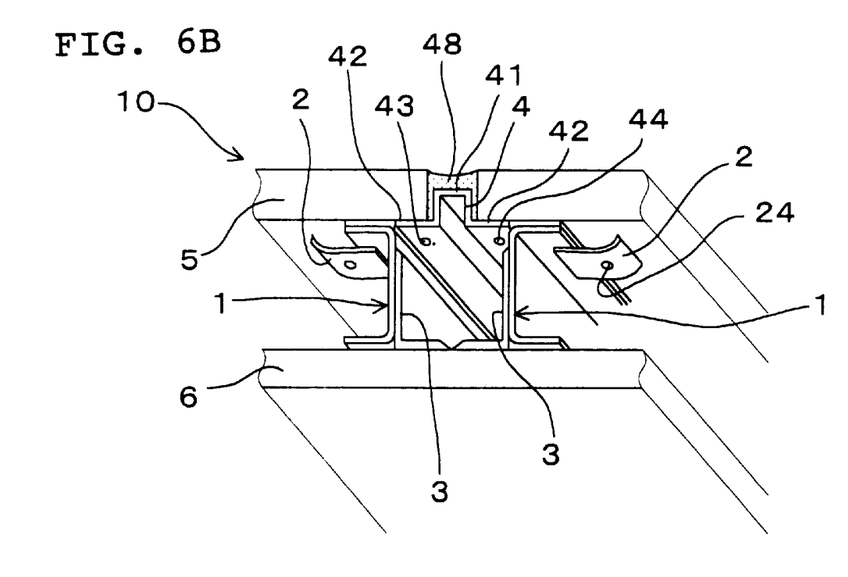
FIG. 6B is a perspective view showing a state wherein the external wall panel constructions are installed on the stud wall in the first embodiment of the present invention.

The hat joiner 4 is long and includes a convex portion 41 and a pair of flat plate fixing portions 42. The convex portion 41 is to be inserted into a gap between the side surfaces of the adjacent external wall panels 5, as shown in FIGS. 6A and 6B. The pair of flat plate fixing portions 42 are to be fixed to the external wall panel 5.

The fixing portions 42 have insertion holes 43 into which screws 44 are inserted. The width of the convex portion 41 is 5–15 mm and the gap between the side surfaces of the adjacent external wall panels 5 is 8–20 mm. The width of the convex portion 41 is shorter by 3–5 mm than the gap.

Figure 7A:
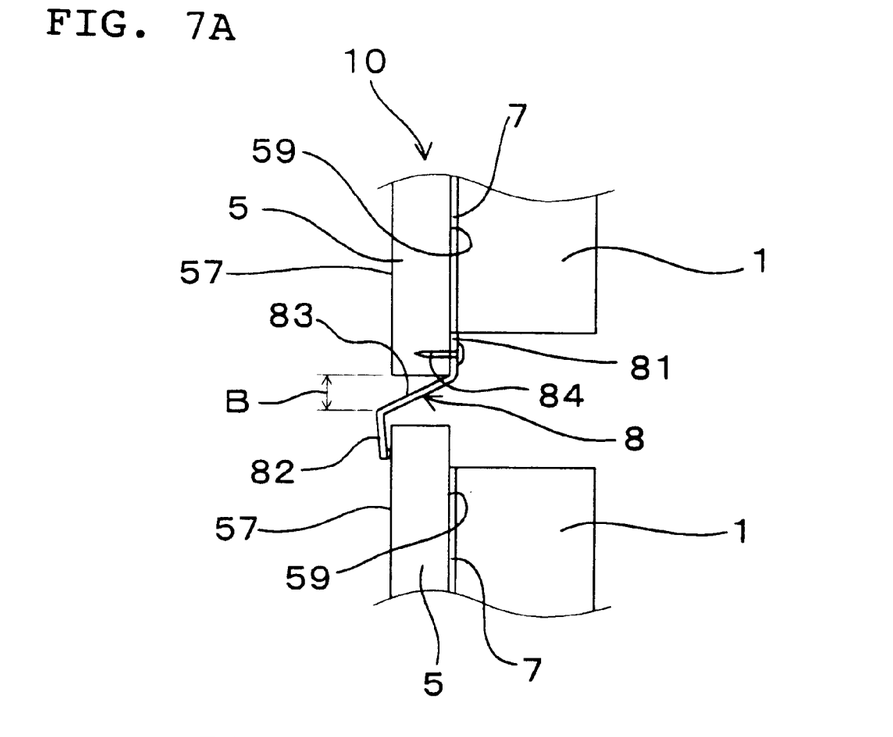
FIG. 7A is a side elevational view showing upper and lower end portions of the external wall, panel constructions in the first embodiment of the present invention.
Figure 7B:
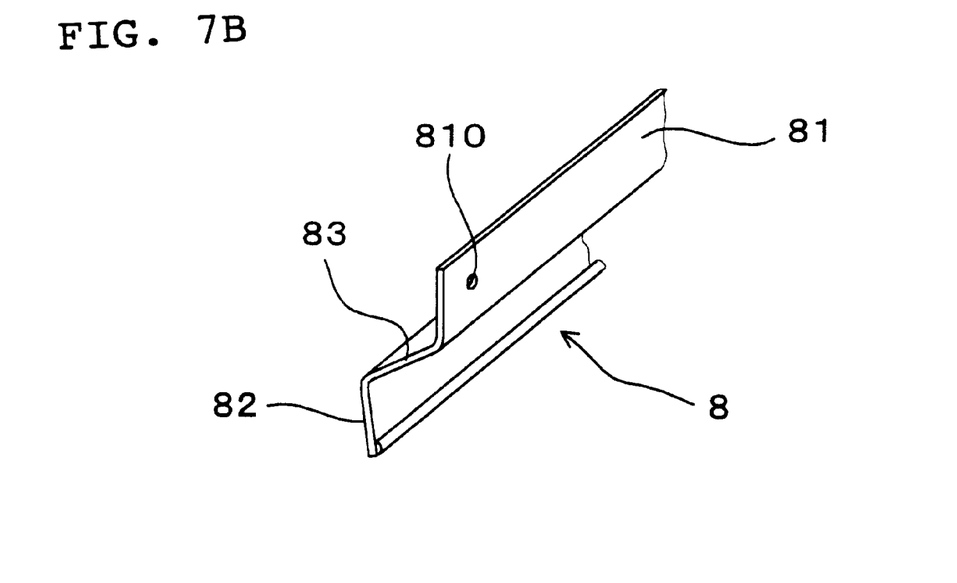
FIG. 7B is a perspective view showing a flashing.

As shown in FIGS. 5, 7A, and 7B, a long flashing 8 is provided in a gap between the upper and lower external wall panels 5. The flashing 8 is for preventing penetration of rainwater into the external wall panels 5. The flashing 8 includes a fixing portion 81, a covering piece 82, and a connecting portion 83. The fixing portion 81 is to be fixed to the rear surface 59 of the upper external wall panel 5. The covering piece 82 is for covering a front surface 57 of the lower external wall panel 5. The connecting portion 83 is for connecting the fixing portion 81 with the covering portion 82. The fixing portion 81 is fixed to the upper external wall panel 5 by inserting a screw 84 through an insertion hole 810.

When the flashing 8 is fixed to the external wall panels 5 between the upper and lower position thereof, the connecting portion 83 is inclined such that the lower portion of the connecting portion 83 is positioned forwardly as compared to the upper portion thereof. A gap B, having a length of 10–15 mm, is formed between the upper external wall panel 5 and the lower end of the connecting portion 83.

The operation and effect of the external wall panel construction 10 of the first embodiment is described in more detail below.

In the external wall panel construction 10, the furring member 1 is held on and fixed to the rear surface 59 of the external wall panel 5 via the fixing plate 2. Thus, the head of the fixing plate 2, for fixing the furring member 1 to the external wall panel 5, is not exposed on the front surface 57 of the external wall panel 5 as in the conventional art.

Accordingly, it is unnecessary to paint the head of the fixing plate in order to cover it to protect it from the elements, and thus partial discoloration of the front surface 57 (see FIGS. 4A to 5B) of the external wall panel 5, as in the conventional art, can be avoided.

Thus, it is possible to apply a high-class design to the surface 57 of the external wall panel 5 without worry that the design might have to be painted over for maintenance of the external wall panel construction 10.

Therefore, the external wall panel construction 10 has an excellent outer appearance.

Further, as the furring member 1 is fixed to the rear surface 59 of the external wall panel 5 via the fixing plate 2, the external wall panel construction 10 has a simple construction.

As described above, the furring member 1 is flexibly fixed to the rear surface 59 of the external wall panel 5 via the fixing plate 2. Thus, even though the external wall panel 5 and the furring member 1 expand or contract in summer or during a rainy season, respectively, and a difference in expansion and contraction between the external wall panel S and the furring member 1 is generated, the external wall panel 5 and the furring member 1 can expand or contract freely. Thus, the external wall panel 5 does not warp. Especially, in the case where the external wall panel 5 is made of concrete and the furring member 1 is made of metal so that the difference in expansion and contraction between the external wall panel 5 and the furring member 1 is large, the external wall panel construction 10 still efficiently prevents the external wall panel 5 from warping.

The furring member 1 is made of steel and thus, even if a fire breaks out, the furring member 1 is not burned so as to be destroyed or damaged, but is instead retained on the external wall panel 5 via the fixing plate 2, and the external wall panel 5 does not drop off its location of the exterior of the building or other structure.

The furring member 1 is fixed to the external wall panel 5 via the fixing plate 2 and the fixing plate 2 is made of metal. Thus, even if a fire breaks out, the fixing plate 2 is not burned so as to be destroyed or damaged and remains in place so as to keep the furring member 1 fixed to the external wall panel 5. Thus, the external wall panel 5 remains and is not dropped from its fixed state with the furring member 1.

The furring member 1 is fixed to the external wall panel 5 via the fixing plate 2 and is also adhered to the external wall panel 5 via the elastic adhesive agent 7. Therefore, the furring member I is securely fixed to the external wall panel 5, and the adhesive agent 7 can absorb the difference between relative expansions and contractions of the furring member 1 and the external wall panel 5.

Further, since the fixing plate 2 is substantially arc-shaped and has a height H greater than that of the fixing surface 120 of the furring member 1, it can fix the furring member 1 more flexibly to the external wall panel 5, thus absorbing the difference of expansion and contraction between the furring member 1 and the external wall panel 5 efficiently.

Since the contact end portion 21 of the fixing plate 2 is hook-shaped (FIG. 2A and 2B), the base portion 12 of the furring member 1 can be fixed to the external wall panel 5 reliably and tightly.

The fixing plate 2 is fixed to the external wall panel 5 via the set screw 24. Therefore, the fixing plate 2 can be prevented from being removed from the external wall panel 5 and fixed thereto flexibly and reliably. Further, the furring member I can be fixed to the external wall panel 5 by the elastic force of the fixing plate 2.

As shown in FIGS. 5, 7A, and 7B, the long flashing 8 is provided between the upper and lower external wall panels 5. Therefore, in rainy weather, rainwater flows along the front surface 57 of the external wall panel 5, drops on the connecting portion 83 of the flashing 8, is guided to the covering piece 82, and flows along the front surface 57 of the lower external wall panel 5. Accordingly, no rainwater penetrates into the external wall panels 5.

Second Embodiment

Figure 8A:
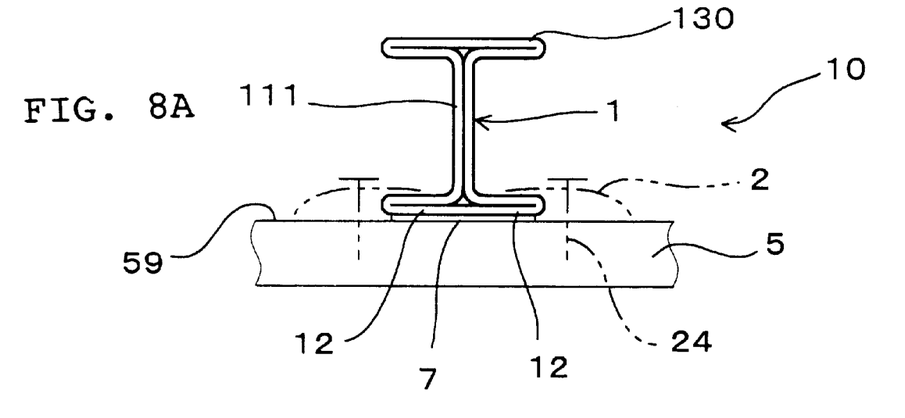
FIG. 8A is a cross-sectional view illustrating the construction of a furring member of a second embodiment of the present invention.
Figure 8B:
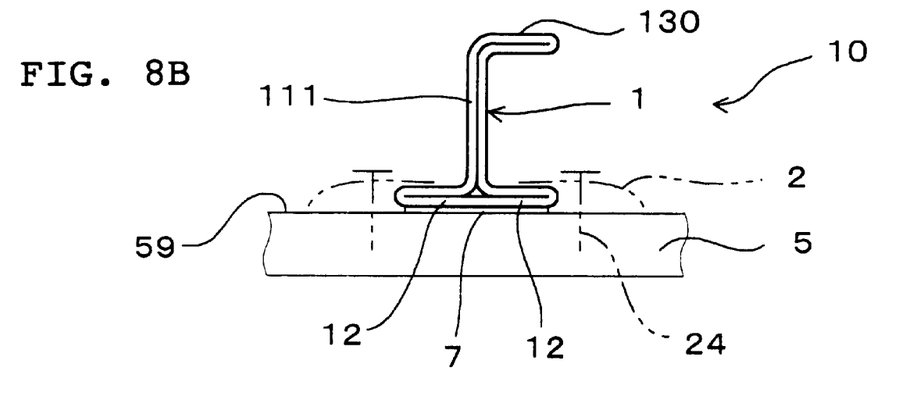
FIG. 8B is a cross-sectional view illustrating the construction of a furring member of a third embodiment of the present invention.
Figure 8C:
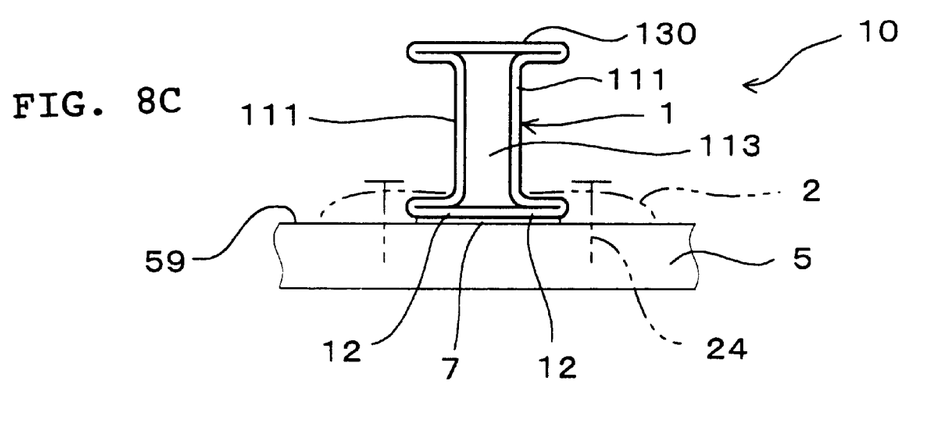
FIG. 8C is a cross-sectional view illustrating the construction of a furring member of a fourth embodiment of the present invention.

As shown in FIG. 8A, an external wall panel construction 10 of the second embodiment has a furring member 1 which is I-shaped (or "sideways" H-shaped) in cross-section.

The furring member 1 includes a base portion 12, a protruding fixing member 111, and a parallel portion 130. The base portion 12 is positioned at one side of the furring member 1 to be fixed to the external wall panel 5. The protruding fixing member 111 protrudes from the base portion 12 for being installed on a stud wall. The parallel portion 130 extend in two opposite directions with respect to the protruding fixing member 111 and is parallel to the base portion 12 at its location on the top end of the protruding fixing member 111.

The base portion 12 is not only adhered to the external wall panel 5 via the elastic adhesive agent 7, but is also held on and fixed to the external wall panel 5 via the fixing plate 2.

The furring member 1 is made of a surface-treated steel plate which has a thickness of 0.8–1.6 mm and is I-shaped in cross-section by being molded with a sizing roll. A molten zinc galvanized steel plate, molten zinc-aluminum alloy galvanized steel plate, and similar are used as the surface-treated steel plate.

The other structural elements of the external wall panel construction 10 of the second embodiment are similar to those of the external wall panel construction 10 of the first embodiment. Thus, the effect of the second embodiment is similar to that of the first embodiment.

Third Embodiment

As shown in FIG. 8B, an external wall panel construction 10 of the third embodiment includes a furring member 1 having an inverted J-shape in cross-section.

The furring member 1 includes a base portion 12, a protruding fixing member 111, and a parallel portion. The base portion 12 is to be fixed to the external wall panel 5. The parallel portion 130 extends in one direction with respect to the protruding fixing member 111, and is parallel with the base portion 12 at it location on the top end of the protruding fixing member 111.

The other structural elements of the external wall panel construction 10 of the third embodiment are similar to those of the external wall panel construction 10 of the first embodiment. Thus, the effect of the third embodiment is similar to that of the first embodiment.

Fourth Embodiment

As shown in FIG. 8C, an external wall panel construction 10 of the fourth embodiment includes a furring member 1 having a double-I-shaped (11-shaped) cross-section.

The furring member 1 includes a base portion 12, two protruding fixing members 111, and a parallel portion 130. The parallel portion 130 is positioned at the top of the protruding fixing member 111. Similarly to the second embodiment, the furring member 1 is made of a surface-treated steel plate which is molded with a sizing roll. In molding the surface-treated plate of the furring member 1, a gap 113 is formed between the protruding fixing members 111.

The other structural elements of the external wall panel construction 10 of the fourth embodiment are similar to those of the external wall panel construction 10 of the second embodiment. Thus, the effect of the fourth embodiment is similar to that of the second embodiment.

Fifth Embodiment

Figure 9:
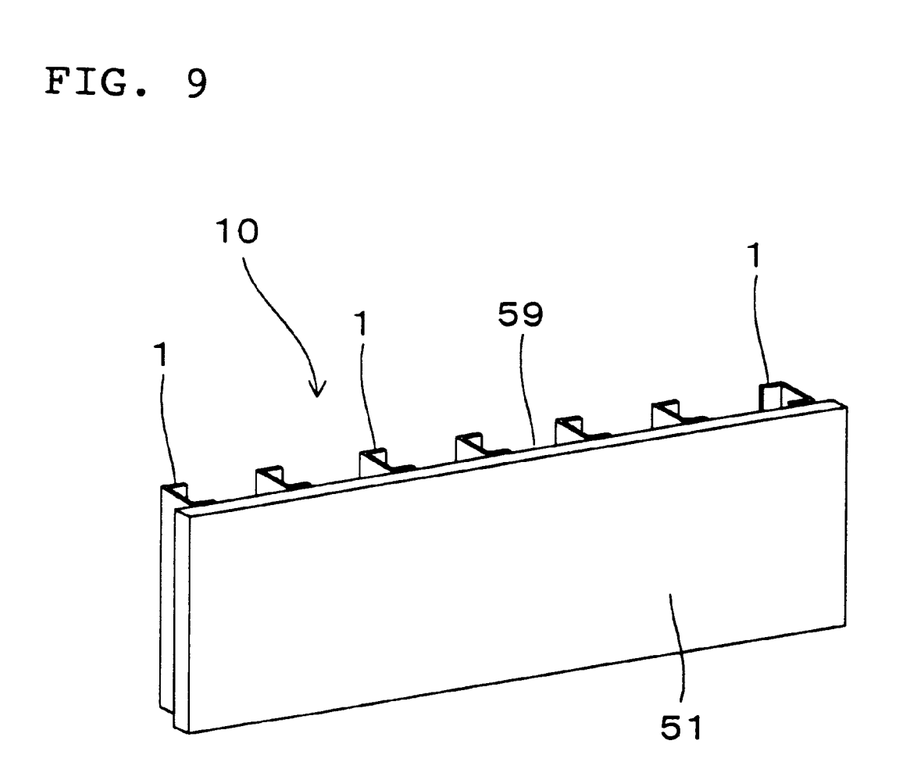
FIG. 9 is a perspective view showing an external wall panel construction of a fifth embodiments the present invention.

As shown in FIG. 9, in an external wall panel construction 10 of the fifth embodiment, an external wall panel 51 has a size of 1 m in length×3 m in width. A plurality of long furring members 1 are vertically fixed to a rear surface 59 of the external wall panel 51. Each furring member 1 is fixed to the external wall panel 51 via a fixing plate (not shown in FIG. 9). The other structural elements of the external wall panel construction 10 of the fifth embodiment are similar to those of the external wall panel construction 10 of the first embodiment.

Thus, the effect of the fifth embodiment is similar to that of the first embodiment.

Sixth Embodiment

Figure 10:
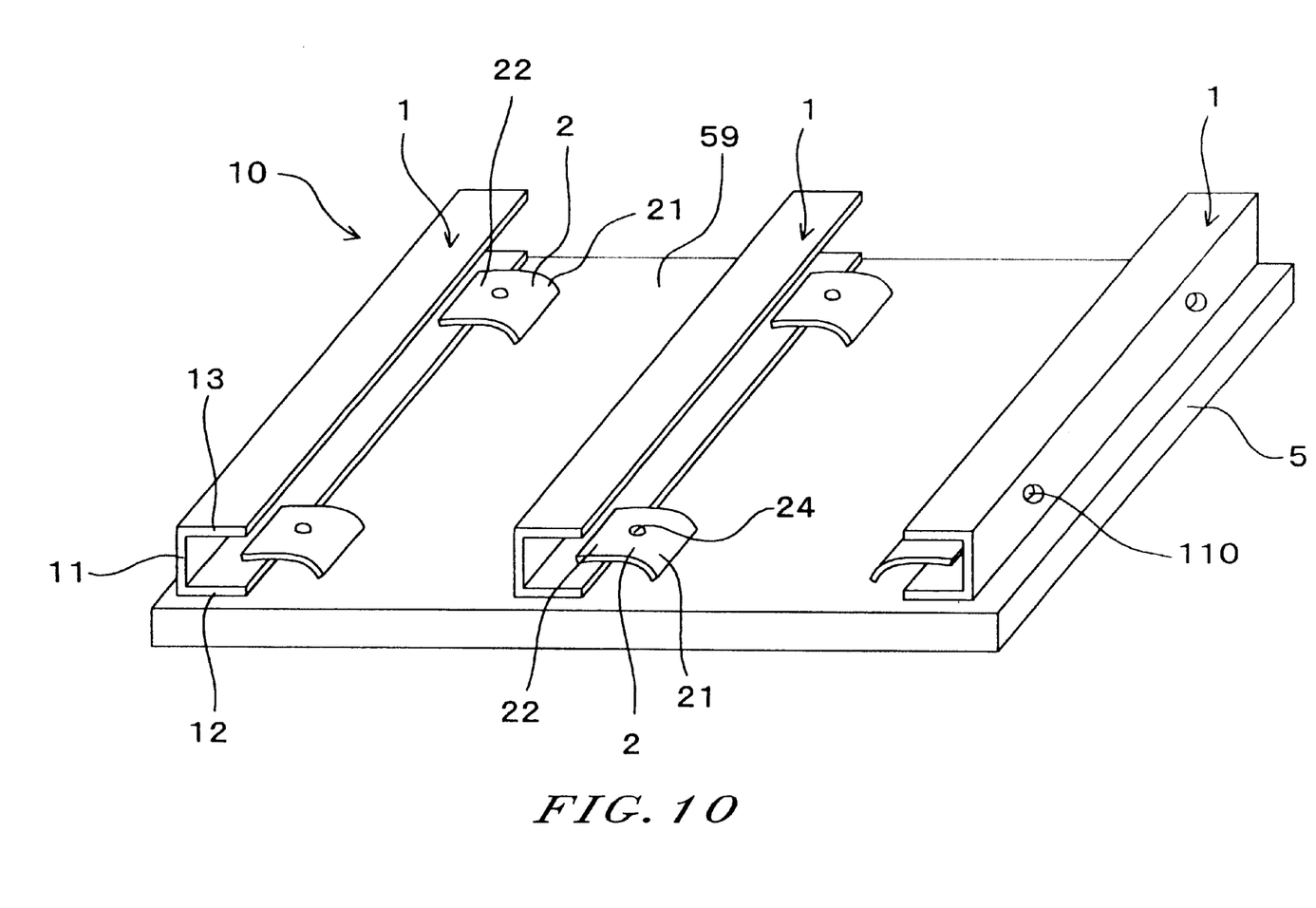
FIG. 10 is a perspective view showing an external wall panel construction of a sixth embodiment of the present invention.

As shown is FIG. 10, an external wall panel construction 10 of the sixth embodiment is different from that of the first embodiment in that an adhesive agent is not provided between the external wall panel 5 and the furring member 1.

The other structural elements of the external wall panel construction 10 of the sixth embodiment are similar to those of the external wall panel construction 10 of the first embodiment. Thus, the effect of the sixth embodiment is similar to that of the first embodiment.

What is claimed is:

1. A wall panel construction comprising:

a wall panel adapted to be installed on an outside of a building;

a plurality of furring members fixed to a rear surface of said wall panel, wherein said plurality of furring members are longitudinally provided independently on said rear surface of said wall panel without contacting each other, and wherein each furring member of said plurality of furring members includes at least an L-shaped cross-section portion having a base portion and a protruding fixing member protruding from said base portion to fix said furring member to a stud wall of the building;

a fixing plate made of metal wherein each furring member of said plurality of furring members is pressed on said rear surface of said wall panel with said fixing plate to be fixed to said wall panel when said wall panel construction is adapted to be connected to the stud wall of the building, wherein said fixing plate is substantially an arc in cross-section so that a height of a top surface of said fixing plate is higher than a height of a top surface of each furring member of said plurality of furring members when said plurality of furring members are fixed to said rear surface of said wall panel with said fixing plate, and wherein said fixing plate is fixed by a set screw which is screwed into and penetrates said wall panel; and an adhesive agent having elasticity, wherein each furring member of said plurality of furring members is also fixed to said wall panel by said adhesive agent in addition to said fixing plate.

2. The wall panel construction according to claim 1, wherein each furring member of said plurality of furring members is made of steel.

3. The wall panel construction according to claim 1, wherein said fixing plate has a front portion and a contact end portion, said front portion line contacting a surface of each furring member of said plurality of furring members, and said contact end portion line contacting said rear surface of said wall panel.

4. The wall panel construction according to claim 1, wherein each furring member of said plurality of furring members is pressed on said rear surface of said wall panel by extending of said fixing plate on said furring member of said plurality of furring members and said rear surface o said wall panel.

5. The wall panel construction according to claim 1, wherein each furring member of said plurality of furring members has an I shape in cross-section and includes a base portion, a protruding fixing member, and a parallel portion, said base portion being positioned at one side thereof to be fixed to said wall panel, said protruding fixing member being erected on said base portion for being connected to the stud wall, and said parallel portion extending in two directions and being parallel with said base portion at a top end of said protruding fixing member.

6. The wall panel construction according to claim 1, wherein each furring member of said plurality of furring members has an inverted J shape in cross-section and includes a base portion, a protruding fixing member, and a parallel portion, said base portion being positioned at one side thereof to be fixed to said wall panel, said protruding fixing member being erected on said base portion for being installed on the stud wall, and said parallel portion extending in one direction and being parallel with said base portion at a top of said protruding fixing member.

7. The wall panel construction according to claim 1, wherein said protruding fixing member includes two plate-like parts which have a clearance therebetween.

8. An wall panel construction comprising:

a wall panel adapted to be installed on an outside of a building to clad outer walls of the building; and a plurality of furring members fixed to a rear surface of said wall panel, wherein:

said plurality of furring members are longitudinally provided independently on said rear surface of said wall panel without contacting each other, each furring member of said plurality of furring members is pressed on said rear surface of said wall panel with a metal fixing plate provided on said rear surface of said wall panel to be fixed to said wall panel when said wall panel construction is adapted to be connected to a stud wall, each furring member of said plurality of furring members includes at least an L-shaped cross-section portion having a base portion fixed on said wall panel and a protruding fixing member protruding from said base portion to fix said furring member to the stud wall, said fixing plate is substantially an arc in cross-section in order to secure a height of said fixing plate at an elevation that is higher than an elevation of a fixing surface of each furring member of said plurality of furring members to be fixed to said wall panel via said fixing plate at said rear surface of said wall panel when said plurality of furring members are fixed to said rear surface of said wall panel with said fixing plate, said fixing plate is fixed by a set screw which is directly screwed into said wall panel such that said set screw does not penetrate through each furring member of said plurality of furring members and a top end of said set screw does not penetrate through said wall panel, and each furring member of said plurality of furring members is fixed to said wall panel by an adhesive agent having elasticity in addition to said fixing plate.

9. The wall panel construction according to claim 8, wherein each furring member of said plurality of furring members is made of steel.

10. The wall panel construction according to claim 8, wherein said fixing plate includes a front portion, which makes contact with a surface of said base portion of said L-shaped cross-section portion of each furring member of said furring members, and a contact end portion, which makes contact with said rear surface of said wall panel, and wherein said front portion and said contact end portion make a line contact with each furring member of said plurality of furring members and said wall panel, respectively.

\* \* \* \* \*